United States Patent [19]

Zimmerman

[11] 4,251,636

[45] Feb. 17, 1981

[54] STANNOUS HALIDE COMPLEXES AND THEIR USE IN PREPARING POLYURETHANE FOAMS

[75] Inventor: Robert L. Zimmerman, Austin, Tex.

[73] Assignee: Texaco Development Corporation, White Plains, N.Y.

[21] Appl. No.: 35,024

[22] Filed: Apr. 30, 1979

[51] Int. Cl.$^3$ .................. C08G 18/14; C08G 18/24; B01J 31/22

[52] U.S. Cl. .................. 521/114; 260/429.7; 260/18 TN; 252/429 R; 521/117; 521/126; 528/49; 528/58

[58] Field of Search .................. 521/126, 114, 117; 252/429 R; 260/429.7 R; 528/58

[56] References Cited

U.S. PATENT DOCUMENTS

| | | | |
|---|---|---|---|
| 3,515,760 | 6/1970 | Wild | 252/429 R |
| 3,661,885 | 5/1972 | Haddick et al. | 260/429.7 |

FOREIGN PATENT DOCUMENTS

| | | | |
|---|---|---|---|
| 936395 | 9/1963 | United Kingdom | 521/126 |
| 1003201 | 9/1965 | United Kingdom | 521/126 |

OTHER PUBLICATIONS

Arribas et al., Informacion de Quimica Analitica, vol. 21, No. 3, pp. 85-96, No. 4, pp. 115-124, (1967).

*Primary Examiner*—H. S. Cockeram
*Attorney, Agent, or Firm*—Carl G. Ries; Robert A. Kulason; Carl G. Seutter

[57] ABSTRACT

Use of stannous halide alcohol complexes, typified by the complex of stannous chloride and triethylene glycol, as catalysts permits production of urethane elastomers characterized by freedom from bubbles. The novel complexes are particularly characterized by their properties; e.g. Mossbauer spectra shows a chemical shift relative to a standard and a quadrupole splitting which are not found in mere mixtures of e.g., stannous chloride and triethylene glycol.

36 Claims, No Drawings

4,251,636

STANNOUS HALIDE COMPLEXES AND THEIR USE IN PREPARING POLYURETHANE FOAMS

FIELD OF THE INVENTION

This invention relates to the preparation of novel urethane products. More particlarly it relates to the use of a novel catalyst system which is particularly characterized by its ability to facilitate formation of non-foamed urethane elastomers.

BACKGROUND OF THE INVENTION

As is well known to those skilled in the art, polyurethanes are prepared by reacting an organic polyfunctional polyisocyanate (typically an aliphatic isocyanate as in the case of coatings, a polymeric isocyanate as in the case of rigid foams, or a tolylene diisocyanate as in the case of flexible foams) with an organic composition having at least two Zerewitinoff active hydrogen atoms. Typical of these latter compositions are various polyesters, polyester amides, polyoxyalkylene polyols, polyoxyalkylene ethers, polyacetals, polyoxyalkylene thioethers, etc.

When the desired product is to be a non-foamed urethane elastomer, the reaction is conducted under anhydrous conditions and no blowing agent is added. When the desired product is topbe a foamed urethane, water and an excess of isocyanate may be added to the mixture; as the water reacts with the isocyanate groups, carbon dioxide is formed and this gas is entrapped within the reaction mixture. In addition (or alternatively) auxiliary blowing agents such as volatile Freons may be added.

When the foamed urethane is the desired product, it is common to add a blowing catalyst which regulates the water-isocyanate reaction. A common blowing catalyst is N-ethyl morpholine.

Common commercial practice includes the addition to either system of a gelling or gel catalyst which controls the reaction of the e.g. polyol and the isocyanate. In the case of the non-foamed elastomer urethanes, blowing catalyst is omitted and a gel catalyst is used.

It is found however that many of the prior art gel catalysts are undesirable in that they are characterized by undesirably high level of toxicity together with attendant ecological disadvantages. Another disadvantage of prior art catalysts is their lack of specificity: i.e. although a particular prior art catalyst may be commonly considered to serve as a gel catalyst, in fact it also serves to catalyze the blowing reaction. This is undesirable in that it proscribes the desired independent control of the gelling reaction and the blowing reaction. In the case of non-foamed urethane elastomers in particular, it is found that gel catalysts heretofore tried undesirably possess sufficiently high blowing catalytic ability so that they catalyze the reaction between isocyanate and trace quantities of water in the system, to give products characterized by an undesirable degree of blowing. In practice, this is observed as undesirable bubbles in a urethane elastomer product.

Although attempts have heretofore been made to provide gel catalysts which possess little or no blowing ability, commercial practice has been to attempt to produce elastomers from dry charge materials which latter meet severe requirements with respect to water content.

It is an object of this invention to provide a novel process for preparing urethane polymers. Other objects will be apparent to those skilled in the art from the description which follows.

STATEMENT OF THE INVENTION

In accordance with certain of its aspects, the novel process of this invention for preparing a polyurethane may comprise reacting (i) an organic composition having at least two Zerewitinoff-active hydrogen atoms and (ii) an organic polyfunctional (including difunctional) polyisocyanate in the presence of, as catalyst, a stannous halide alcohol complex.

DESCRIPTION OF THE INVENTION

The organic polyfunctional polyisocyanates which may be employed in practice of the process of this invention may contain two or more isocyanate groups per molecule. In the preferred embodiment, they preferably contain 2–3, typically 2.2–2.7 isocyanate groups. Suitable polyfunctional isocyanates include alkylene diisocyanates such as hexamethylene diisocyanate and decamethylene diisocyanate, arylene diisocyanates such as phenylene diisocyanates, tolylene diisocyanates, naphthalene diisocyanates, 4,4' diphenylmethane diisocyanates, or isomers or mixtures of any of these. Triisocyanates, typically obtained by the reaction of three moles of an arylene diisocyanate with one mole of hexanetriol or of trimethylol propane, may be employed. When the product polyurethane is a non-foamed elastomer (whether rigid or flexible), the preferred polyisocyanate may be a polymeric diisocyanate such as an isocyanate made from formaldehyde and aniline via phosgenation. When the product is a coating, the preferred polyisocyanate may be an aliphatic diisocyanate such as isophorone diisocyanate. When the product is a flexible foam, preferred polyisocyanate may be the mixture of 80% 2,4-tolylene diisocyanate and 20% 2,6-tolylene diisocyanate.

The substances having two or more active hydrogen atoms as determined by the Zerewitinoff method e.g. the polyoxyalkylene polyols which may be employed in practice of this invention will be organic compounds having two or more reactive hydrogen atoms which will react with organic polyfunctional isocyanates to give urethane polymers. These polyoxyalkylene polyols, may include polyesters, polyethers, polyisocyanate modified polyesters, polyisocyanate modified polyester amides, alkylene glycols, polymercaptans, polyamines, polyisocyanate modified alkylene glycols, etc. It will be understood that these polyoxyalkylene polyols may have active primary or secondary hydroxyl groups. The polyoxyalkylene polyol may be a hydroxyl-containing polyether including fatty acid glycerides. Polyesters, which are a preferred type of polyoxyalkylene polyol, may be obtained by esterification-condensation reaction of e.g. an aliphatic dibasic carboxylic acid with a glycol or a triol or mixture thereof in proportions such that the resultant polyesters may contain predominantly terminal hydroxyl groups. Dibasic carboxylic acids suitable for preparing polyesters may include aliphatic and aromatic acids, such as adipic acid, fumaric acid, sebacic acid, phthalic acid; suitable alcohols include ethylene glycols, diethylene glycols, trimethylol propane, etc. The fatty acid glycerides may include those having a hydroxyl number of at least about 50 such as castor oils, hydrogenated castor oil, or blown natural oils.

Polyethers, another preferred type of polyoxyalkylene polyol, may include polyoxyalkylene glycols, e.g.

polyethylene glycols and polypropylene glycols, preferably having a molecular weight of at least 200. For convenience, the term "polyol" or "polyoxyalkylene polyol" may be employed to designate the substances having two or more active hydrogen atoms as determined by the Zerewitinoff method, which may be employed in practice of this invention.

Formation of the preferred urethane non-foamed elastomers of this invention is effected by reacting (i) an organic composition having at least two Zerewitinoff-active hydrogen atoms and (ii) an organic polyfunctional polyisocyanate in the presence of, as catalyst, a stannous halide alcohol complex.

Formation of product by practice of the process of this invention may be effected by using isocyanate and organic composition (i.e. polyol) in amount to provide an isocyanate index in the reaction medium of 0.7-1.5, preferably 0.9-1.2, say 1.1. The isocyanate index is the ratio of equivalents of isocyanate groups to equivalents of Zerewitinoff-active hydrogen atoms in the total composition. Catalyst is present in amount of 0.01-5 w %, preferably 0.1-2 w %, say 1 w % of the polyol.

Various other ingredients including filler, pigments, reinforcing agents, flow-control agents, flameproofing agents etc. may be incorporated into the composition.

It may, in one embodiment, be desirable to utilize the process of the invention in a prepolymer technique using as charge a prepolymer formed from an excess of isocyanate and a polyol which then may be reacted with additional polyol.

Preparation of a non-foamed urethane elastomer by the process of this invention may include addition of the components plus catalyst to a reaction vessel at 20° C.-80° C.; preferably 20° C.-50° C., say 25° C. and mixing the components. The gel time may be varied by varying the amount of catalyst and the components of the system.

The elastomer may be subsequently cured at 50° C.-200° C., preferably 80° C.-100° C., say 80° C. for 1-90 minutes, say 60 minutes.

Non-foamed elastomers so prepared may be found to be substantially free of foaming as determined by a shore hardness test or visually by the presence of surface bubbles in a specimen 8 cm in diameter and 50 mm in thickness after curing.

It is a feature of the process of this invention that the gelling catalyst employed is substantially free of any ability to serve as a blowing catalyst. Accordingly it is not necessary to employ anhydrous reactants as is the case for prior art non-foamed elastomer systems. It is found for example that it is necessary in many prior art systems to maintain the water content of the charge polyol at a level less than 0.10 w % and preferably less than 0.01 w %. Commonly charge materials, when they are to be used in prior art elastomer compositions, require additional drying prior to use to a water content of less than 0.01 w %.

Because of the fact that the stannous alcohol complex gel catalysts of this invention do not evidence any substantial ability to serve as a blowing catalyst, the components of the elastomer-forming mixture need not be free of water. More particularly they may be used "as is" without any effort being made to insure that they are dry. In practice, this means that a water content of up to 0.1 w % may be found.

Formation of an elastomer is effected by reacting (i) an organic composition having at least two Zerewitinoff-active hydrogen atoms, (ii) an organic polyfunctional polyisocyanate, and (iii) as a gel catalyst a stannous halide alcohol complex. In the preferred embodiment, there may also be present fillers, pigments, reinforcing agents, flow control agents, fire retardants, etc.

Formation of a foamed urethane product is effected by reacting (i) an organic composition having at least two Zerewitinoff-active hydrogen atoms, (ii) an organic functional polyisocyanate, (iii) a blowing agent, commonly water, (iv) a cell modifying agent typified by a silicone such as the trimethyl end-blocked dimethyl polysiloxane marketed by Union Carbide under the trademark L-520, (v) a blowing catalyst and (vi) as a gel catalyst a stannous halide alcohol complex.

In a typical "one-shot" formuation, these components are typically added to the reaction mixture in the parts by weight noted in the following table (it will be apparent to those skilled in the art that the parts by weight may vary as the molecular weight or the number of functional groups varies):

TABLE

| Component | Broad | Preferred | Typical |
|---|---|---|---|
| Polyol | 12-250 | 60-250 | 100 |
| Isocyanate | 10-500 | 25-200 | 50 |
| Cell Modifying Agent | 0.01-10 | 0.2-4 | 1 |
| Blowing Agent | 0-10 | 1-5 | 3 |
| Blowing Catalyst | 0.1-5 | 0.5-2 | 1 |
| Gelling Catalyst | 0.1-5 | 0.5-2 | 1 |

The blowing catalyst which may be employed may be a typical blowing catalyst typified by an amine such as N-ethyl morpholine, etc.

In this typical "one-shot" formulation, the components are added to a reaction vessel at 20° C.-80° C., preferably 20° C.-50° C., say 20° C. and thoroughly mixed.

In the case of the foamed urethanes, the novel catalyst of the process of this invention is found to process a distinct advantage in that since it is substantially free of ability to catalyze the blowing reaction, it permits a very high degree of separate control of the blowing and gelling reactions i.e. each may be independently controlled by varying the type or amount of catalyst without undesirably affecting the other.

The stannous halide alcohol complex gelling catalysts which may be employed in practice of the process of this invention are characterized by the formula $$SnX_2 \cdot a\ A$$

In the above formula, X may be halide. Although it may be possible to form complexes wherein X is fluoride or iodide, it is more preferred that the halide be a bromide or a chloride. In the most preferred embodiment, the halide is chloride. Although it is possible to form complexes when both X groups are not identical (e.g. one is chloride and one is fluoride), commonly they will be identical.

As will be noted infra, it is possible to attain desirably different results depending on which halide is present - e.g., the chloride may give results which are different from those attained when the bromide is present.

When the above complex is a stannous halide alcohol complex, the symbol A may be an alcohol i.e. an organic hydroxy compound typified by an alcohol per se, a glycol, a polyol, a poly ether polyol etc. In the preferred embodiment, the alcohol i.e. the organic hydroxy compound will be a polyol (such as ethylene glycol, propylene glycol, etc.) and more preferably a polyoxyalkylene polyol (such as dipropylene glycol, diethyleneglycol, etc.) In the stannous halide complex, preferably a stannous chloride glycol complex, the mole ratio of alcohol compound (e.g. alcohol or glycol) to stannous halide may be 1:1 to 2:1 say 1:1. It may typically be desirable to use the complex in an excess of an alcohol preferably the same as that of the complex. In this instance, there may be present alcohol to give mole ratios of 1:1 to 100:1, preferably 1:1 to 5:1, say 4:1.

The symbol a may represent a number which commonly falls in the range of 1–2. It is a feature of the products of this invention that a is typically an integer such as 1 or 2.

When the organic hydroxy compound is a monohydroxy alcohol, it may be characterized by the formula ROH. In the formula ROH, R may be a hydrocarbon radical selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, betaphenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, napthyl, etc. When R is alkaryl, it may typically be tolyl, xylyl, etc. R may be inertly substituted i.e. it may bear a non-reactive substituent such as alkyl, aryl, cycloalkyl, ether, halogen, etc. Typically inertly substituted R groups may include 3-chloropropyl, 2-ethoxyethyl, carboethoxymethyl, 4-methyl cyclohexyl, p-chlorophenyl, p-chlorobenzyl, 3-chloro-5-methylphenyl, etc. In one aspect of the invention, preferred R groups may be lower alkyl, i.e. $C_1$–$C_{10}$ alkyl, groups including e.g. methyl, ethyl, n-propyl, i-propyl, butyls, amyls, hexyls, octyls, decyls, etc. The R groups in a specific composition may be the same or different.

Illustrative monohydroxy compounds which may be used to form the complexes of this invention include the following:

TABLE methanol
ethanol
n-propanol
i-propanol
butanols
hexanols
octanols
dodecanol
phenol
benzyl alcohol
cyclohexyl alcohol When the alcohol or organic hydroxy composition is a polyhydroxy alcohol, it may be characterized by the formula R′ (OH)$_x$ wherein x is an integer greater than 1 and R′ is selected from the same grouping as that from which R is selected - subject to the qualification that x hydrogen atoms on R′ have been replaced by an equal number of hydroxyl groups.

In one preferred embodiment, the R group in ROH may be residue of a polyol in which case the R group may be of the form —R′(OH)$_y$. In this instance, the ROH may be glycol such as ethylene glycol HOCH$_2$CH$_2$OH in which y is 2 and R′ is —CH$_2$CH$_2$—. It will be apparent that R′ in this instance be selected from the same group as was R, subject to the qualification that the R′ bears y hydroxyl groups in place of an equal number of hydrogen groups.

Illustrative polyols include:

TABLE ethylene gylcol
propylene glycol-1, 2
propylene glycol-1,3
sorbitol
trimethylol propane
pentaerythritol
tetramethylene glycol It will also be apparent that the R group may include an ether moiety as in the case of the following:

TABLE diethylene glycol
triethylene glycol
dipropylene glycol

In practice of the process of this invention for preparing alcohol complexes of stannous halide, one mole of SnX$_2$ is reacted with the desired amount (a moles wherein a is 1–2 moles, say 1 mole of alcohol.

Although it is a feature of the process of this invention that it may be possible to utilize reactants used in preparation of the complexes, which contain water it is desirable to utilize dry reactants to the end that the reaction mixture contains less than 1 w % of water. If the mixture contains significantly more water then 5 w %, it is desired (at least if the product is to be used as urethane catalyst) that the water be stripped from the reaction mixture.

If it be desired to utilize the reaction product in situ, it may be desirable to add to the reaction mixture the equivalent amount of alcohol (eg glycol) to form product, this may commonly be a product containing (per mole of SnX$_2$) an integral number of moles of alcohol groups. More commonly however, it may be desirable to utilize an excess of ROH in which case the product may be a solution (of the complex) or suspension (of the complex) in the excess of alcohol, eg glycol, glycol ether, etc.

In the preferred embodiment, the charge alcohol if not dry, may (when it is a higher molecular weight eg glycol) be dried prior to reaction by heating to temperature of 100° C.–150° C., say 100° C. and 0.5–50mm Hg, say 2.5 mm Hg for typically 0.5–5 hours, say 1 hour to remove water. The preferred charge is anhydrous stannous halide, typically anhydrous stannous chloride.

Reaction is prefereably carried out at 25° C.–200° C., say 100° C. and pressure of 0.5–2000 mm Hg, preferably 0.5–50 mm Hg, say about 1.5 mm Hg for 0.5–4 hours, say 1 hour. Although no hydrogen halide is typically liberated during reaction, it is preferred to utilize a nitrogen purge during reaction.

The product alcohol complexes are typically soluble in the alcohol from which they are formed; and normally they will not be recovered prior to further use.

Illustrative specific alcohol complexes which may be prepared by the process of this invention include the following:

TABLE

SnCl$_2$.2 HO (CH$_2$CH$_2$O)$_3$ H

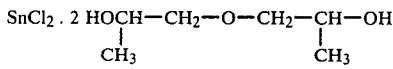

SnCl$_2$.1 C$_2$H$_5$OH
SnCl$_2$.1 C(CH$_2$OH)$_4$
SnCl$_2$.2 n—C$_{12}$H$_{25}$OH
SnCl$_2$.2 HOCH$_2$CH$_2$OH
SnBr$_2$.2 HO (CH$_2$CH$_2$O)$_3$ H
SnBr$_2$.2 C (CH$_2$OH)$_4$
SnF$_2$.1 HO(CH$_2$CH$_2$O)$_{50}$H
SnI$_2$.2 HOCH$_2$CH$_2$OH

The complexes prepared by the process of this invention, eg the complex of one mole of stannous chloride and one mole of dipropylene glycol, are characterized by properties which are clearly distinguishable for example from the properties of other compositions including the separate charge components eg stannous chloride and dipropylene glycol. For example if the product complex is analyzed by infra red spectroscopy, it is found that the bands in the spectrum of the complex are characteristically quite different than eg those of the charge. For example this illustrative complex has peaks at the following wave numbers: 7.73, 8.08, 8.83, 9.28, 11.83, and 12.10. In contrast, there are no predominant peaks at these points in the charge stannous chloride or dipropylene glycol. Dipropylene glycol, for example has peaks at the following wave numbers: 7.65, 7.97, 8.75, 9.20, 11.65, and 11.90. It will be apparent to those skilled in the art that these substantially different spectra represent formation of the desired new complex or ligand.

It should also be noted that the intensity of the maximum peaks is signficantly different. It is clear that the peaks for the complex are different, both in location and intensity, than peaks observed for the glycol.

Comparable conclusions may be observable by consideration of a Mossbauer spectra. It is found for example that if a comparison is made of (i) a stannous halide and (ii) a complex of a stannous halide and an alcohol, that the spectrum of the latter exhibits significantly changes in the values for the chemical shift and for quadrupole splitting, which clearly indicate the formation of a complex rather than a mere mixture or solution.

The novel products of this invention are particularly characterized by (i) their unexpectedly high degree of activity as gelling catalyst in urethane systems with simultaneous low activity as blowing catalysts, (ii) their low toxicity as compared to prior art gelling catalysts containing lead, mercury, etc., (iii) their ability to permit use of "damp" charge to urethane elastomer production without detrimental effect on the product, (iv) their ability to permit attainment of more sharp and independent control of the blowing and gelling reactions in foamed urethane systems etc. It is of particular interest that, when used as catalysts in elastomer formation, they permit attainment of desired delay before gelation i.e. it may be possible to delay gelation for periods as long as desired eg in one instance up to 24 hours. At the end of the desired delay time, the elastomer may be gelled by heating eg to 80° C. Clearly the delay time is a function of the amount of catalyst used—longer delay time being attained by use of less catalyst.

The urethane elastomers of this invention may be used as gasket materials, as sealants, etc. The foamed urethanes may be used as cushions, filters, etc.

DESCRIPTION OF PREFERRED EMBODIMENTS

Practice of the novel process of this invention may be apparent from the following description of preferred embodiments wherein, as elsewhere in this specification, all parts are parts by weight unless otherwise specifically noted.

In certain of the Examples which follow, the following properties are measured:

Viscosity (cps): measured in a Brookfield LVT viscometer;

Working time (minutes): the time at which a curing elastomer has a viscosity of 20,000 cps at the reaction temperature when measured in a Brookfield LVT viscometer;

Gel time (seconds or minutes): the time at which an elastomer or foam has hardened to a degree such that, after scratching or touching with a spatulator glass rod, it does not flow or knit back into a continuous configuration;

Shore A-2 hardness: Determined by ASTM test D-2240;

Compression Load Deflection (pounds per square inch): Determined by ASTM Test D-575;

Compressive Set (%): Determined by ASTM Test D-395, Method B;

Resilience (%): Determined by ASTM Test D-2632;

Tensile Strength (pounds per square inch) determined by ASTM Test D-368;

100% Modulus (pounds per square inch): determined by ASTM Test D-412;

Ultimate Elongation (%): determined by ASTM Test D-412;

Tear (pounds per lineal inch): determined by ASTM Test D-624;

Initial Tear (pounds): determined by ASTM Test D-1938; and

Maximum Tear (pounds): determined by ASTM Test D-1938.

EXAMPLE I

In this example which shows preparation of a stannous chloride complex, a 250 ml, three-necked, round bottom flask equipped with a mechanical stirrer, thermometer, and vacuum outlet is charged with 92 grams (0.6 moles) of triethylene glycol. It is dried by heating to 100° C. at 2.5 mm Hg for 1 hr. and then allowed to cool to 30° C. Anhydrous stannous chloride (24 grams, 0.12 moles) is added. A nitrogen purge is also introduced into the system. The reaction mixture is heated to 150° C. and held at that temperature for 1 hour under 1.7 mm Hg vacuum with a nitrogen purge. The resulting solution is yellow in color. Product is formed in substantially stoichiometric yield in solution in 0.36 mols of triethylene glycol).

EXAMPLE II

In this example which shows preparation of a stannous chloride complex, reaction is carried out in a 250 ml, three-necked flask equipped with a mechanical stirrer, thermometer, and reflux condensor with vacuum outlet. Dipropylene glycol (90 grams) is added and it is dried by heating to 100° C. at 1 mm Hg for 1 hour. After the glycol is cooled to 65° C., 24 grams of anhydrous stannous chloride is added. The flask is nitrogen-purged and heated to 115° C. under 1.5 mm Hg. and held at this temperature and pressure for 1 our. The solution was very, very light yellow in color.

Product is formed in substantially stoichiometric yield (in solution in the excess of glycol).

The complex prepared in this Example II was analyzed by Mossbauer spectra measured as solid at 77° K. (and also as liquid) with reference to a standard Ba$^{119}$ SnO$_3$ at room temperature. These results were compared to the spectrum of anhydrous stannous chloride powder taken under comparable conditions.

In separate tests Mossbauer spectra of the product of this Example II were also measured relative to alpha tin.

In the following table there are set forth the isomer shift $\delta$ and the quadrupole splitting $\Delta$. All entries are ±0.04 mm/s; and the units are millimeters per second. The values in the "Complex" column are each the average of two readings on the same sample (one liguid and one frozen) taken on successive days.

TABLE

|  | SnCl$_2$ | Complex |
|---|---|---|
| Quadrupole Splitting $\Delta$ | 0 | 1.745 |
| Isomer Shift $\delta$ Relative to BaSnO$_3$ | 4.16 | 3.565 |
| Isomer Shift $\delta$ Relative to Alpha Tin | 2.07 | 1.475 |

It will be apparent from the above table that the Isomer Shift $\delta$ (whether measured against the barium stannate standard or the alpha tin standard) has decreased by 0.595 mm/s. Similarly the Quadrupole Splitting $\Delta$ has increased from 0 to 1.745 mm/s. These shifts show that the composition of this invention is a complex and not merely a mixture of the charge materials.

EXAMPLE III

In this example which shows the preparation of a mixed stannous chloride glycol complex, a 250 ml flask and vacuum outlet is charged with 50 grams (0.39 moles) of dipropylene glycol. 58.6 grams (0.39 moles) of triethylene glycol and 14.8 grams (0.078 moles) of anhydrous stannous chloride. The reaction is heated to 100° C. at 5 mm Hg for 2 hours. A water white solution resulted.

EXAMPLE IV

In this example, the process of Example I is followed except that the reactants include one mole of anhydrous stannous chloride and one mole of anhydrous ethylene glycol.

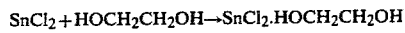

EXAMPLE V

In this example which shows preparation of a urethane non-foamed elastomer by the process of this invention, there is added to a 10 ounce cup 1.0 gram of the catlyst of Example I plus 150 grams of a polyol- containing uncatalyzed "B-component" containing:

(i) 61.06$%w % of olyoxypropylene glycol (M. wt of ca 21) as marketed under the trademark Thanol® PPG-2000.

(ii) 2.85 w % of ethylene glycol mono-methyletherinitiated polyether chain stopper (m. wt. ca 1580) qv. U.S. Pat. No. 3,875,086 6 (iii) 33.58 w % of filler containing calcined clay as the major component (iv) 1.43 w% of 2-hydroxyethyl 2-hydroxypropyl carbamate (v) 1.10 w % of 2,6-di-t-butyl-p-cresol antioxidant After mixing for one minute and adjusting the temperature to 25° C., 19.6 grams of polymeric isocyanate (as marketed under the trademark PAPI 901) were added. The mixture was stirred for one minute.

One portion of the reaction mixture was then poured into a lid 8 cm in diameter and a second portion into a 5 oz. cup. The lid was placed in an 80° C. oven for thirty minutes. The cup was allowed to stand at room temperature while its viscosity and temperature were monitored. The cup had a working time of 4.8 minutes and a gel time of 7.2 minutes. Shore A-2 hardness on the cup: 1.5 hr: 45/0, 37/5; 25 hrs.: 50/0, 46/5; and five days: 53/0, 51/5. The lid gave a Shore A-2 hardness of 45/0, 45/5 at 0.5 hours. Neither elastomer showed any evidence of bubbles due to the water-isocyanate reaction.

From this example, it is apparent that use of the catalyst of this invention permits formation of product urethane elastomers which are desirably free of bubbles.

EXAMPLE VI*

In a control example, the procedure of Example V is duplicated except that in place of the catalyst of Example I, there is added 0.8 grams of finely crushed anhydrous stannous chloride.

Gelation of elastomer occurred but much more slowly than in Example V; and the product was an an inferior elastomer. This shows the advantages of using the complex of the invention.

EXAMPLE VII

In this example which shows preparation of a non-foamed urethane elastomer by the practice of this invention, there is added to the reaction vessel 150.8 grams of an uncatalyzed "B component" having the same composition as that of Example V. The temperature is adjusted to 25° C.

0.8 grams of the catalyst of Example II are added together with 20.5 grams of a poymeric isocyanate (as marketed under the trademark PAPI 901). The mixture, at 25° C., is stirred for 1 minute and poured into a 8 cm lid and a 5 oz. cup. The lid was placed in an 80° C. oven for ½ hour. The cup was allowed to stand at room temperature with its temperature and viscosity being monitored. It gave a working time of 4.5 minutes and a gel time of 7.25 minutes. Shore A-2 hardness of the cup at 80 minutes was 37/0, 31/5. The Shoe A-2 hardness of the lid after 0.5 hr. was 47/0, 47/5.

EXAMPLE VIII

In this example which shows preparation of a non-foamed urethane elastomer (in the presence of added water) by the practice of this inventon, there is added to a reaction vessel 150 grams of the B-component containing 0.1 w % water. To this is added 1 gram of the catalyst of Example II and 0.1 gram of water. After mixing and adjusting the temperature to 25° C., there are added 19.6 grams of polymeric isocyanate (as marketed under the trademark PAPI 901) and the mixture is mixed for one minute.

The reaction mixture is poured into an 8 cm lid and a 5 oz. cup. The lid was placed in an 80° C. oven for 0.5 hour. The cup was allowed to cure at room temperature. Shore A-2 hardness on cup was 51/0, 50/5; on the lid after 0.5 hour 43/0, 43/5.

No foaming was observed thus demonstrating that the catalyst is a gel catalyst and not a blowing catalyst - even when the formulation contains water otherwise sufficient to form a foamed product. If this formulation were modified by addition of e.g. 1 gram of N-ethyl morpholine, a commercial blowing catalyst, it would be found that a foamed urethane is prepared.

EXAMPLES IX-X*-XI

In this series of comparative examples, the procedure of Example VIII is followed except as indicated. In each example 1.0 gram of water is added (instead of 0.1 gram as in Example VIII). In Example X* the polyol formulation also contains 0.3 grams of a commercial gel catalyst (phenyl mercury propionate) which is not present in Examples IX and XI.

The polymeric isocyanate of Example VIII is present in Examples IX and XI in amount of 19.6 grams, and in Example X* in amount of 18.6 grams. This difference in weight is not a significant difference to explain the results noted infra.

The gel catalyst of Example I is used in Example IX. The gel catalyst of Example II is used in Example XI.

It was observed that the experimental systems of Examples IX and XI desirably foamed only a little despite the unusually high content of water. The control system of Example X* foams substantially more due to the presence of the prior art gel catalyst.

The Compressive Load Deflection (pounds per square inch) and the Compressive Set (%) are determined and tabulated in Columns A and B infra.

TABLE

| Example | A | B |
| --- | --- | --- |
| IX | 9.55 | 43.4 |
| X* | 4.23 | 67.6 |
| XI | 9.94 | 45.8 |

From the Examples and from the above table, it is apparent that use (in Examples IX and XI) of the stannous chloride complex catalysts of this invention permits attainment of the following advantages:

(i) the experimental product is characterized by very little foaming in contrast to control Example X* which undesirably foamed a lot more;

(ii) the experimental product is characterized by a desirably higher Compressive Load Deflection which is more than double that of the control Example X*;

(iii) the experimental product is desirably characterized by a substantially lower Compressive Set than that of the product of Control Example X*.

EXAMPLE XII

In this example which shows the preparation of a stannous chloride glycol complex, a 100 ml round bottom flask equipped with a magnetic stirrer, thermometer and vacuum outlet is charged with 46 grams of THANOL G-400 brand triol (a glycerin based polyoxypropylene triol with approximate molecular weight of 400). The system is dried by heating to 100° C. at 4 mm Hg for 1 hour and then cooled. Anhydrous stannous chloride is added and the mixture heated to 150° C. under 0.3 mm Hg for 45 minutes.

Product is formed in substantially stoichiometric yield (in the excess of triol).

EXAMPLE XIII

In this example, the procedure of Example VII is followed except that only 20 grams of the polymeric isocyanate are used and the catalyst (1 gram) is that of Example XII. /x4P The non-foamed urethane elastomer gave a working time of 5.2 minutes and a gel time of 7.25 minutes. Shore A-2 hardness: on cup after 1.5 hours 41/0, 36/5; on the lid after ½ hour at 80° C., 51/0, 51/5. No evidence of foaming is observed.

EXAMPLE XIV

In this example which shows a preparation of a non-foamed urethane elastomer by the process of this invention, there is added to a 2 liter resin flask, 887 grams of an uncatalyzed, commercially available polyol containing B-component similar to that of Example V.

4.73 grams of the catalyst of Example I are added and the mixture is agitated, degassed, and brought to 25° C. 118.3 grams of polymeric isocyanate (as marketed under the trademark PAPI 901) are added and the mixture stirred for 30 seconds.

The reaction mixture was poured into an 8 cm lid which was placed in an 80° C. oven for 30 minutes, two circular molds 1 inch in diameter, and a sheet mold 8 inches by 8 inches. They were allowed to stand a room temperature for 2 hours then placed in an 80° C. oven for 1.5 hours.

EXAMPLE XV

In this example, the procedure of Example XIV is duplicated except that isocyanate (marketed under the trademark THANATE P-220 a polymeric-isocyanate of formula

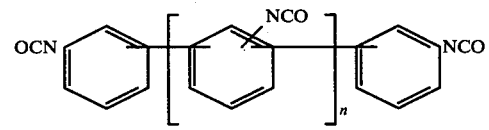

Properties of the elastomers of Examples XIV-XV are as follows:

| Property | Example XIV | Example XV |
| --- | --- | --- |
| Shore A-2 Hardness Disc | 62/0 | 56/0 |
| % Resilience | 48.5 | 44.0 |
| Tensile psi | 594 | 503 |
| 100% Modulus, psi | 291 | 232 |
| Ultimate Elongation, % | 266 | 293 |
| Tear, pli | 79.2 | 72.5 |
| Intial Tear, lbs. | 9.89 | 15.86 |
| Maximum Tear, lbs. | 9.82 | 15.7 |
| Compression set, % | 13.7 | 18.4 |
| Compression Load Deflection lb/in.$^2$ | 107 | 77.7 |

EXAMPLES XVI-XIX

In each of this series of Examples, a urethane elastomer formulation is made up containing (i) as polyol 52.3 grams of a glycerin based polyol formed by reaction of glycerin, ethylene oxide, and propylene oxide—it is predominantly a polyoxypropylene triol of aveage m. wt. of ca 3000. There is also added 16.8 grams of the adduct of aniline with 2.5 moles of ethylene oxide. There is added as isocyanate, 32.3 grams of diphenylmethane diisocyanate (as marketed under the trademark ISONATE 143 L). 0.02 grams of catalyst is present.

The catalysts are as follows:

| Example | Catalyst |
|---|---|
| XVI* | Dibutyl tin dilaurate |
| XVII* | zinc 2-ethylhexoate |
| XVIII* | 50% stannous 2-ethylhexoate in diisooctyl phthalate |
| XIX | the catalyst of Example I |

In these examples, two 8 cm. round molds are used, one at room temperature (RT) and the other in an 80° C. oven, as well as a thin sheet cured in an 80° C. oven. Formulation and results are presented in the Table which follows:

TABLE

| | | 2 Day Shore A-2 Hardness | | |
|---|---|---|---|---|
| Example | Foamed | 8 cm R.T | 8 cm 80° C. | Sheet 80° C. |
| XVI* | Yes | — | 48/0 | — |
| XVII* | Yes | 43/0 | 42/0 | 44/0 |
| XVIII* | Slightly | 63/0 | 64/0 | 64/0 |
| XIX | No | 68/0 | 70/0 | 70/0 |

From the above table, it will be apparent that only the product of Example XIX prepared in accordance with this invention was satisfactory. It did not foam as did the product of the control examples. Furthermore, the hardness of the product was desirably better than those prepared by the control processes.

EXAMPLE XX

In this example which shows preparation of a stannous chloride complex, reaction is carried out in a 1 liter, three necked flask equipped with a thermometer, mechanical stirrer and vacuum outlet. 500 grams of a polyoxypropylene glycol of m. wt. of ca 2000 (as marketed under the trademark THANOL PPG-2000 polyol) are added. The system is dried by heating to 100° C. at 1 mm Hg for 1 hour, cooled to 30° C. and then there is added 25 grams of anhydrous stannous chloride. The reaction mixture is heated to 120° C. under 1.4 mm Hg vacuum for 1 hour.

Product is obtained in substantially stoichiometric amount.

EXAMPLE XXI

In this example which shows preparation of a stannous chloride alcohol complex reaction is carried out in a 250 ml. three necked flash equipped with a magnetic stirrer, thermometer and reflux condenser with a vacuum outlet. 90 grams of lauryl alcohol is added and drying is effected by refluxing at 1.2 mm Hg vacuum. After cooling to 30° C., 24 grams of anhydrous stannous chloride is added. The mixture is heated to 113° C. at 0.7 mm Hg for 1 hour.

Product is obtained in substantially stoichiometric yield.

EXAMPLES XXII-XXIII

These examples show that a polyester can be used as the polyol. The polyester is a diethylene glycol adipate polyester with a hydroxyl number of 103. The catalyst is that prepared in Example II. The procedure is the catalyst and polyester are premixed, then the isocyanate added, followed by mixing. The reaction mixture is poured into two 8 cm, round molds. One is placed in an 80° C. oven and the other left at room temperature. In Example XXII the catalyst is present in amount of 0.1 g. In Example XXIII the catalyst is present in amount of 1.0 g. The polyisocyanate is a modified diphenyl methane diisocyanate (marketed under the trademark ISONATE 143 L).

TABLE

| Example | Catalyst | Polyester | Polyisocyanate | Gel at Room Temp | Gel at 80° C. |
|---|---|---|---|---|---|
| XXII | 0.1 g | 77.4 g | 22.6 g | 4 hrs. | 11 min. |
| XXIII | 1.0 g | 77.4 g | 24.6 g | 5.5 min | 4.5 min |

From the above table, it is apparent that polyesters may be employed as the polyol. Example XXII also demonstrates that when the catalyst is present in amount of as little as 0.1 gram, the reaction is sensitive to heat. Specifically gel time at room temperature of ca 25° C. is ca 4 hours while that at 80° C. is only 11 minutes.

EXAMPLES XXIV-XXV

In these examples, a prepolymer formulation is prepared in standard manner by mixing 1125 parts of 4,4' methylene diphenyl diisocyanate with 1500 parts of a polytetramethylene glycol of approximate molecular weight of 1000, for 2.5 hrs at 80° C. The product is found to have an equivalent weight of 450.4. This propolymer (90 parts) is mixed with 8.8 parts of 1,4-butane diol and the catalyst of Example II. The procedure otherwise follows that of Examples XXII-XXIII—using the catalyst of Example II.

TABLE

| Catalyst | Gel at Room Temperature, min. | Gel at 80° C. min |
|---|---|---|
| 0.1 g | 10.25 | 5.4 |
| 1.0 g | 2.75 | 2.25 |

EXAMPLES XXVI-XXVII*

In this pair of examples, the urethane elastomer is prepared in manner comparable to the procedure of Example V. The isocyanate used in isophorone diisocyanate, an aliphatic diisocyanate (12.3 grams in Example XXVI and 10.8 grams in Example XXVII). The polyol used is 89.2 grams of the triol of Example XVI (as marketed under the trademark THANOL F-3014 Polyol). The catalyst is 1.0 gram of the product of Example III in Example XXVI. In Example XXVII the catalyst is a commercially available catalyst—dibutyl tin dilaurate.

The product of this invention prepared in Example XXVI is found to be free of bubbles while the control product of Example XXVII* is undesirably found to possess many bubbles.

EXAMPLES XXVIII-XXIX

In this pair of examples, the procedure of Examples XXVI-XXVII is generally followed. The polyol is 89.1 grams of triol of weight of ca 300 (as marketed under the trademark THANOL TE-3000). The polyisocyanate is isophorone diisocyanate (12.4 grams in Example XXVIII and 13.9 grams in Example XXIX. The catalyst is that prepared in Example II (1.0 gram in Example XXVIII and 2.0 grams in Example XXIX).

The gel properties of the products, when determined as in Examples XXVI-XXVII* are

| Example | R.T. Gel | 80° C. Gel |
| --- | --- | --- |
| XXVIII | 5 hrs | 29 min |
| XXIX | 4 hrs | 14 min |

From the above table it will be apparent that use of aliphatic isocyanates permits attainment of desirable product urethane elastomers which may be cured 10–15 times faster at 80° C. than at room temperature.

Results comparable to the above may be obtained if the $SnX_2$ is:

| Example | $SnX_2$ |
| --- | --- |
| XXX | $SnBr_2$ |
| XXXI | $SnF_2$ |
| XXXII | $SnI_2$ |

It will be observed that comparable results are achieved when glycol complexes of $SnBr_2$ are used as urethane elastomer catalyst. The bromide-containing systems however are less resistant to catalysts of the water-isocyanate blowing reaction, then are the corresponding chloride-containing systems.

Thus the alcohol complex of $SnBr_2$ and triethylene glycol gives elastomers which contained a few bubbles. This is a satisfactory system although it is less preferred for this reason then the corresponding chloride system which is bubble free.

It appears however that the bromide system may be more desirable in that it gives better delayed reaction characteristics. In comparable runs in a urethane elastomer system, the following is noted:

| Example | System | Working time min | Gel time min |
| --- | --- | --- | --- |
| XXXIII | Bromide | 14.25 | 20.25 |
| XXXIV | Chloride | 14.25 | greater than 30 |

From this table, it is apparent that use of the bromide system desirably permits attainment of shorter gel time when the working time is equal to that of a corresponding chloride system.

EXAMPLE XXXV

In this example, there is prepared a flexible foam suitable for carpet backing.

In the pot of a Hobart mixer Model K5-A equipped with a wire whip, was placed the following materials:

| Parts | Component |
| --- | --- |
| 100 | 3500 molecular weight propoxylated ethoxylated adduct of glycerin |
| 11.45 | 1,4-butanediol |
| 6 | silicone surfactant (L5612 brand sold by Union Carbide Corp.) |
| 31.2 | 80 wt % 2,4-toluene diisocyanate 20 wt % 2,6-toluene diisocyanate |

They were mixed for 10 minutes at a mixer speed of four. Then 0.25 parts of the catalyst from Example II ($SnCl_2$ · dipropylene glycol complex) were added followed by mixing for two more minutes at a mixer speed of four. The froth was poured into an 8"×8" mold and placed in a 110° C. oven. It was tack free in fourteen minutes. At room temperature it was workable for about eight minutes.

EXAMPLE XXXVI

This example shows that the catalysts of this invention can be used to prepare a flexible foam which can stand 5 minutes at room temperature without reacting, but will foam and cure when placed in a hot oven.

| B-Component parts | |
| --- | --- |
| 100 | 5000 molecular weight, high primary hydroxy propoxylated ethoxylated glycerin. |
| 0.1 | silicone surfactant (Union Carbide's L-5303) |
| 0.33 | catalyst from Example II ($SnCl_2$-dipropylene glycol) |
| 0.3 | JEFFAMINE AP-22 amine, 2.2 functional aromatic amine made from the condensation of aniline and formaldehyde |
| 2.9 | THANOL TR-380, an ethoxylated aniline |
| 24 | Trichlorofluoromethane |
| A-Component | |
| 11.3 | polymethylene polyphenyl isocyanate, approximately 2.7 functional, prepared by phosgenation of the reaction product formed by the condensation of aniline and formaldehyde (Mondur MR sold by Mobay). |

The A- and B-components were mixed using a high speed stirrer then poured into a mold. The reaction mixture sat 5 minutes at room temperature without creaming at which time it was placed in an 80° C. oven. The mixture was transformed into a flexible foam in the oven.

XXXVII

This example shows that a rigid foam with a very long cream time can be obtained.

| B-Component parts | |
| --- | --- |
| 33.4 | propoxylated sorbitol average m.w. 700 |
| 3.7 | styrene allyl alcohol polymer equivalent weight 200 |
| 1.5 | silicone surfactant (Dow Corning DC-193) |
| 1.3 | trichlorofluoromethane |
| 1 | catalyst from Example II ($SnCl_2$ dipropylene glycol) |
| A-Component | |
| 47.4 | of a prepolymer (90 wt % polymeric isocyanate (Mondur MR) 10 wt % of a phosphorus-containing polyol, OH No. 205, 11.3% P) Vircol 82 sold by Mobil Chemical Co. |

The A- and B-components were mixed for 30 seconds using a high speed stirrer then poured into a box mold. The foam creamed in 4 minutes, rose in 12 minutes and was tack-free in 9 minutes.

| | TEST | |
| --- | --- | --- |
| Density | ASTM D-1622 | 2.17 pcf |
| K-factor | Du Pont modified guarded hot plate | 0.120 btu in/hr-$ft^2$ · °F. |
| Compressive strength | ASTM D-1621 | |

| -continued | | |
|---|---|---|
| | TEST | |
| with rise | | 36.48 psi |
| cross rise | | 15.06 psi |
| Friability | ASTM D-421-71 | 12.8% weight loss |
| % Closed cells | ASTM D-2856 | 91.91% |
| Dimensional stability | ASTM D-2126 | Dimensional changes |

| | Δ vol. | Δ wt. | Δ Linear |
|---|---|---|---|
| 158° F./100% rel. humid. | +10.9% | −1.3% | +5.4% |
| 200° F./dry | +4.8% | −0.7% | +3.7% |
| −20° F./dry | −3.9% | +0.3% | −2.0% |

EXAMPLE XXXVIII

This example shows the use of the catalyst for preparing coating.

| B-Component parts | |
|---|---|
| 27.5 | diethylene glycol-adipic acid polyester (avg. eq. wt. 1000) |
| 12.7 | propoxylated glycerin (avg. molecular weight 260) |
| 0.03 | catalyst from Example II (SnCl$_2$-dipropylene glycol) |
| A-Component | |
| 25.2 | modified methylene diphenyl diisocyanate (Isonate 1431, sold by Upjohn Co.) having an equivalent weight of ca 143. |

The A- and B-components were mixed for 30 seconds and then allowed to set for 13 minutes at room temperature. At this time part of the mixture was spread on a 4"×4" metal plate and degassed. After 20 minutes (from time of mixing) the plate was placed in an 80° C. oven and cured. The resulting coating was clear and bubble free.

The following data are for a Taber abrasion test (ASTM D-1044-56): 1000 grams, 1000 cycles, CS-17 wheel coating. Only 2.5 mg was lost.

EXAMPLE XXXIX

This example shows the use of the catalyst in an adhesive.

| B-Component parts | |
|---|---|
| 19.35 | diethylene glycol-adipic acid polyester (OH No. 103) |
| 0.02 | catalyst from Example II (SnCl$_2$ dipropylene glycol) |
| A-Component | |
| 5.65 | modified methylene diphenyl diisocyanate (Isonate 143L) |

The A- and B-components were mixed for 30 seconds then brushed on pretreated (wiped with a 5% solution of a modified methylene diphenyl diisocyanate in methylene chloride and dried at room temperature for 15 minutes) fiber glass plates. The material was then degassed. After 10 minutes the plates were clamped together and placed in a 120° C. oven to cure. Tensile shear 696 psi (ASTM D-1002).

EXAMPLE XL

In this example the catalyst of Example II (SnCl$_2$-dipropylene glycol) is used in a conventional flexible foam.

| B-Component parts | |
|---|---|
| 100. | propoxylated cap, ethoxylated and propoxylated glycerin avg. molecular weight 3500 |
| 4 | water |
| 1 | silicone surfactant (Union Carbide's L-520) |
| 0.9 | catalyst from Example II |
| A-Component | |
| 32.5 | toluene diisocyanate |

The A- and B-components were mixed using a high speed stirrer then poured into a mold. A foam was produced.

Although this invention has been illustrated by reference to specific embodiments, it will be apparent to those skilled in the art that various changes and modifications may be made which clearly fall within the scope of this invention.

I claim:

1. The process of preparing a polyurethane which comprises reacting (i) an organic composition having at least two Zerewitinoff-active hydrogen atoms and (ii) an organic polyfuctional polyisocyanate, in the presence of, as gel catalyst, (iii) a stannous halide alcohol complex.

2. The process of preparing a polyurethane as claimed in claim 1 wherein said stannous halide complex is a stannous halide alcohol complex of a polyether polyol.

3. The process of preparing a polyurethane as claimed in claim 1 wherein said stannous halide alcohol complex is a complex of stannous halide with an alcohol selected from the group consisting of alcohols, glycols, and polyether polyols.

4. The process of preparing a polyurethane as claimed in claim 1 wherein said stannous halide alcohol complex is a complex of stannous halide with a monohydroxy alcohol.

5. The process of preparing a polyurethane as claimed in claim 1 wherein said stannous halide alcohol complex is a complex of stannous halide with a glycol.

6. The process of preparing a polyurethane as claimed in claim 1 wherein said stannous halide alcohol complex is a complex of stannous halide with a poly(oxyethylene) glycol.

7. The process of preparing a polyurethane as claimed in claim 1 wherein said stannous halide alcohol complex is a complex of stannous halide with a poly(oxypropylene) polyol or a poly(oxyethylene) polyol.

8. The process of preparing a polyurethane as claimed in claim 1 wherein said stannous halide alcohol complex is a complex of stannous halide with a poly(oxyethylene) triol or a poly(oxypropylene) triol.

9. The process of preparing a polyurethane as claimed in claim 1 wherein said stannous halide complex is characterized by the formula ti SnX$_2$·a A wherein X is halide, A is an alcohol and a is a number other than zero.

10. The process of preparing a polyurethane as claimed in claim 1 wherein said halide is chloride or bromide.

11. The process of preparing a polyurethane as claimed in claim 1 wherein said halide is chloride.

12. The process of preparing a polyurethane as claimed in claim 1 wherein said stannous halide complex is characterized by the formula SnX$_2$·a A wherein a is an integer 1-2.

13. The process of preparing a polyurethane as claimed in claim 1 wherein said polyurethane is a non-foamed polyurethane elastomer.

14. The process of preparing a polyurethane as claimed in claim 1 wherein said polyurethane is a foamed polyurethane prepared in the presence of a blowing agent.

15. The process of preparing a polyurethane as claimed in claim 1 wherein said polyurethane is a foamed polyurethane prepared in the presence of a blowing catalyst.

16. The process of preparing a non-foamed polyurethane elastomer characterized by substantial freedom from bubbles which comprises reacting (i) an organic composition having at least two Zerewitinoff active hydrogen atoms and (ii) an organic polyfunctional polyisocyanate in the presence of, as gel catalyst, (iii) an alcohol complex of stannous chloride or of stannous bromide thereby forming a non-foamed polyurethane elastomer characterized by substantial freedom from bubbles; and recovering said polyurethane elastomer.

17. The process of preparing a non-foamed polyurethane elastomer characterized by substantial freedom from bubbles which comprises reacting (i) an organic composition having at least two Zerewitinoff active hydrogen atoms and (ii) an orginic polyfunctional polyisocyanate in the presence of, as gel catalyst, (iii) an alcohol complex of stannous chloride and a polyoxyethylene glycol.

18. The process of preparing a foamed polyurethane which comprises reacting (i) an organic composition having at least two Zerewitinoff active hydrogen atoms; (ii) an organic polyfunctional polyisocyanate; (iii) a blowing agent (iv) a blowing catalyst; and (v) an alcohol complex of stannous chloride or of stannous bromide thereby forming a foamed polyurethane; and recovering said foamed polyurethane.

19. The process of preparing a foamed polyurethane as claimed in claim 18 wherein said complex is an alcohol complex of stannous chloride and a polyoxyalkylene polyol.

20. Stannous bromide alcohol complex.

21. SnX$_2$·a A wherein X is halide, A is an organic hydroxy compound, and a is a number 1-2.

22. The composition claimed in claim 21 wherein A is a polyoxypropylene glycol.

23. The composition as claimed in claim 21 wherein A is a polyoxyethylene glycol.

24. Stannous chloride complex of polyoxyalkylene glycol.

25. The method of preparing a polyurethane, which is characterized by a delayed gelation period, which comprises reacting (i) an organic composition having at least two Zerewitinoff-active hydrogen atoms and (ii) an organic polyfunctional polyisocyanate, in the presence of, as gel catalyst an alcohol complex of stannous chloride.

26. A solution of a stannous bromide alcohol complex in an excess of alcohol.

27. A solution, in an excess of a polyoxyalkylene glycol, of SnX$_2$·a A wherein X is halide A is a polyoxyalkylene glycol, and a is a number 1-2.

28. A solution claimed in claim 27 wherein A is a polyoxypropylene glycol.

29. A solution as claimed in claim 27 wherein A is a polyoxyethylene glycol.

30. Stannous chloride complex of polyoxyalkylene glycol in solution in polyoxyalkylene glycol.

31. Stannous bromide complex of polyoxyalkylene glycol in solution in polyoxyalkylene glycol.

32. SnBr$_2$·a A wherein A is an organic hydroxy compound, and a is an integer 1-2.

33. SnBr$_2$·a A as claimed in claim 32, wherein A is a polyoxyalkylene glycol.

34. SnBr$_2$·a A as claimed in claim 32, wherein A is a polyoxyethylene glycol.

35. SnBr$_2$·a A as claimed in claim 32, wherein A is a polyoxypropylene glycol.

36. SnBr$_2$·A wherein A is a polyethylene glycol.

* * * * *

UNITED STATES PATENT AND TRADEMARK OFFICE
CERTIFICATE OF CORRECTION

PATENT NO. : 4,251,636
DATED : February 17, 1981
INVENTOR(S) : Robert L. Zimmerman It is certified that error appears in the above-identified patent and that said Letters Patent are hereby corrected as shown below:

Col. 1 correct the Title to read "STANNOUS HALIDE COMPLEXES AND THEIR USE IN PREPARING POLYURETHANES".

line 27 cancel "topbe", insert -- to be --;

Col. 9, line 3 correct the spelling of "hour";
line 19 correct the spelling of "liquid";
line 64 cancel "$%".

Col. 10, line 28 correct the spelling of "invention";

Col. 12, line 5, cancel "/x4P";

Col. 15, line 23, cancel "catalysts", insert -- catalysis --;

Claim 9, line 4, cancel "ti";

Claim 21, lines 1-2 cancel "an organic hydroxy compound", insert -- a polyoxyalkylene polyol --.

Signed and Sealed this

Twenty-seventh Day of October 1981

[SEAL]

Attest:

GERALD J. MOSSINGHOFF

Attesting Officer   Commissioner of Patents and Trademarks